(12) United States Patent
Wang et al.

(10) Patent No.: US 6,210,042 B1
(45) Date of Patent: Apr. 3, 2001

(54) ISOTHERMAL JOURNAL BEARING

(75) Inventors: Qian Wang, 6890 SW. 88$^{th}$ St., Apt. #B103, Miami, FL (US) 33156; Yiding Cao, 10637 Hammock Blvd., #926, Miami, FL (US) 33196

(73) Assignees: Qian Wang, Wilmette, IL (US); Yiding Cao, Miami, FL (US)

( * ) Notice: Subject to any disclaimer, the term of this patent is extended or adjusted under 35 U.S.C. 154(b) by 0 days.

(21) Appl. No.: 09/097,507

(22) Filed: Jun. 15, 1998

Related U.S. Application Data

(60) Provisional application No. 60/050,245, filed on Jun. 19, 1997.

(51) Int. Cl.$^7$ ..................................................... F16C 37/00
(52) U.S. Cl. ........................................... 384/317; 384/321
(58) Field of Search .................................. 384/317, 321, 384/320, 318, 313, 314, 315

(56) References Cited

U.S. PATENT DOCUMENTS

| | | | |
|---|---|---|---|
| 1,723,928 | * 8/1929 | Fisher | 384/317 |
| 2,744,796 | * 5/1956 | Walters | 384/321 |
| 2,774,566 | * 12/1956 | Richardson | 384/317 X |
| 2,826,463 | * 3/1958 | Newman | 384/321 |
| 3,267,997 | * 8/1966 | Matarese et al. | 384/317 X |

FOREIGN PATENT DOCUMENTS

| | | | |
|---|---|---|---|
| 994402 | * 8/1976 | (CA) | 384/321 |
| 264105 | * 1/1927 | (GB) | 384/321 |
| 781085 | * 8/1957 | (GB) | 384/317 |
| 193930 | * 11/1983 | (JP) | 384/317 |

* cited by examiner

*Primary Examiner*—Thomas R. Hannon

(57) ABSTRACT

Described herein is an isothermal journal bearing that incorporates heat pipes for temperature reduction and uniformity. The heat pipes can be fabricated by turning and are arranged within the bearing wall circumferentially. Due to the high thermal conductance of the heat pipe, frictional heat produced at the contact and during the rubbing process can be dissipated promptly through the entire bearing wall, resulting in a lower temperature in the pressurized region and a relatively uniform temperature along the circumference of the bearing. The temperature reduction and uniformity would significantly reduce the bearing failure tendency due to heat accumulation and bearing thermal distortion.

5 Claims, 4 Drawing Sheets

(a)

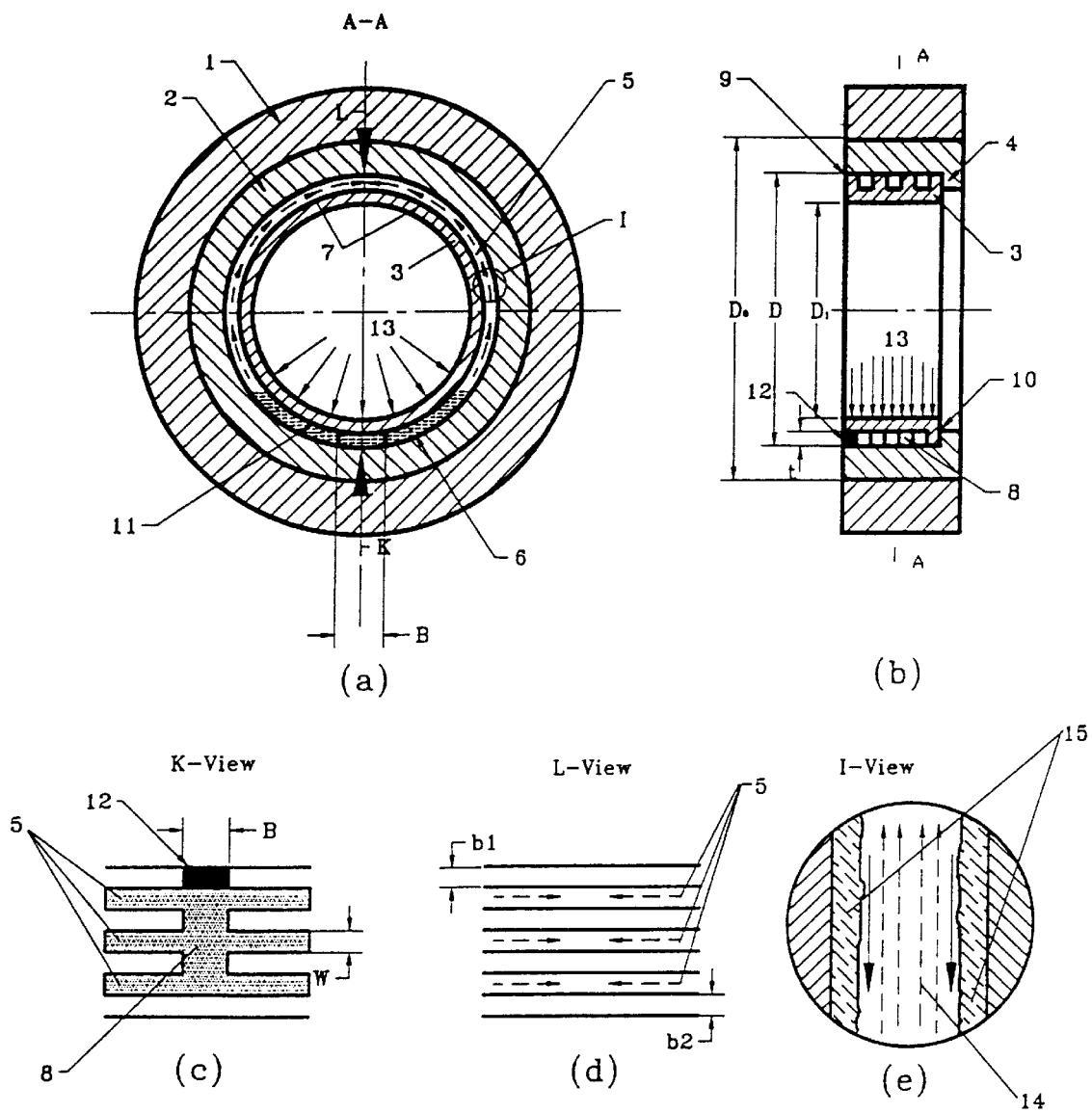
Figure 1: Schematic of a thermal-journal bearing that consists of a bearing house and a bushing. The bushing has two rings and groove heat pipes are machined in the inner ring.
(a) Cutaway view A-A.
(b) Sectional view.
(c) Viewing the inner ring in K direction.
(d) Viewing the inner ring in L direction.
(e) Enlarged view of the heat pipe showing the vapor flow and liquid return.

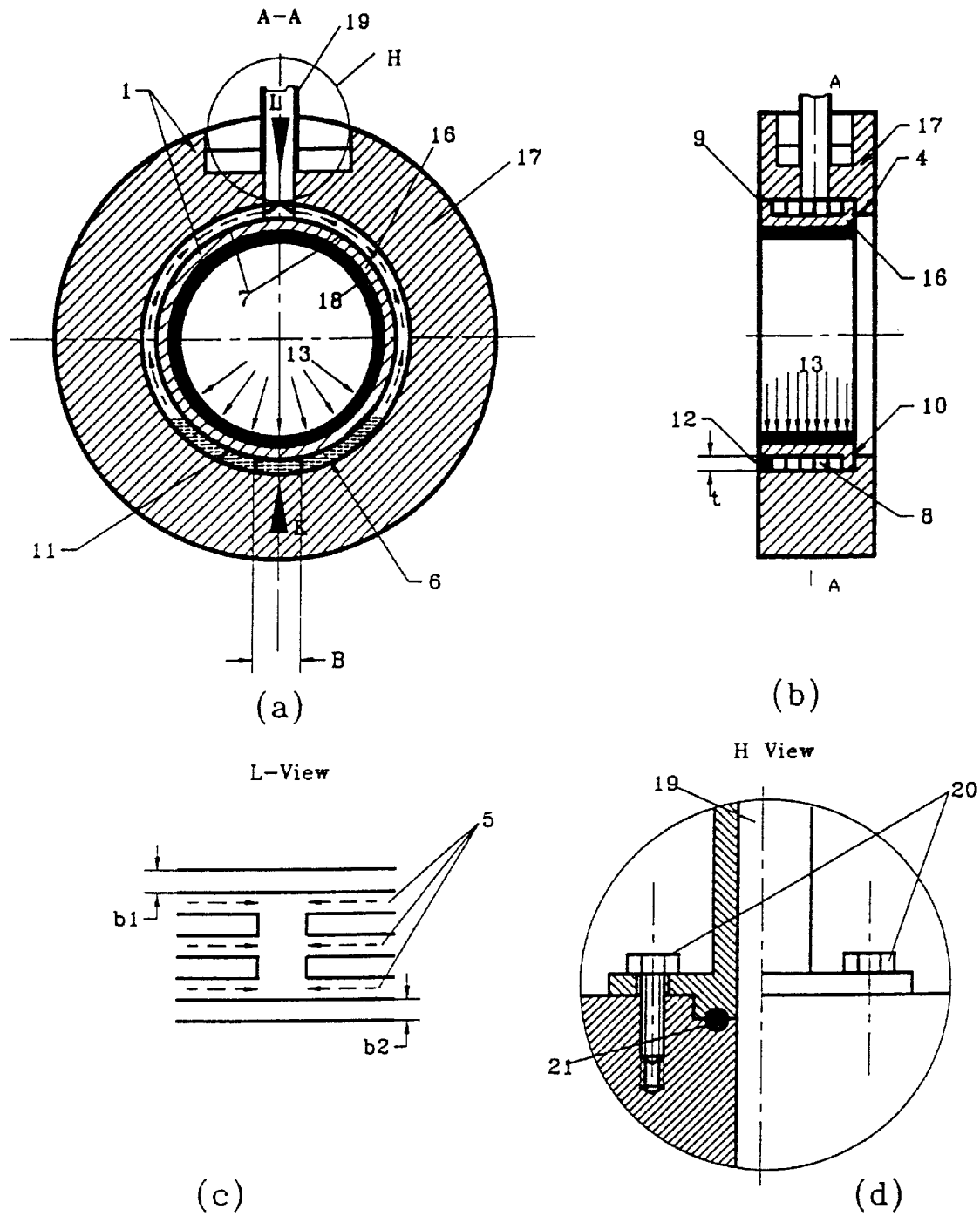
Figure 2: Schematic of the thermal-journal bearing with groove heat pipes in the bearing house. An cooling outlet connects the groove heat pipes with an external cooling source for enhanced cooling.
(a) Cutaway view A-A.
(b) Sectional view.
(c) Viewing the inner ring in L direction.
(d) Enlarged view of the connection.

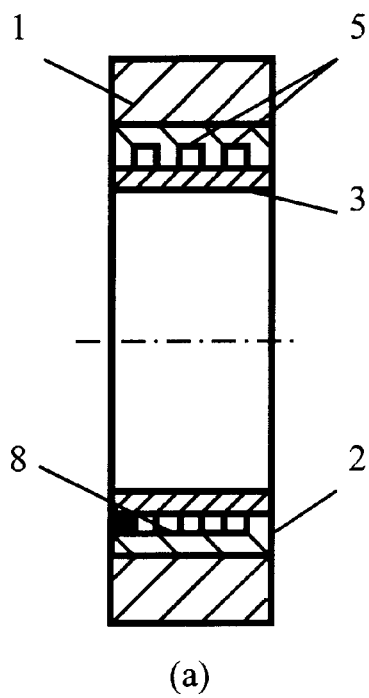
(a)
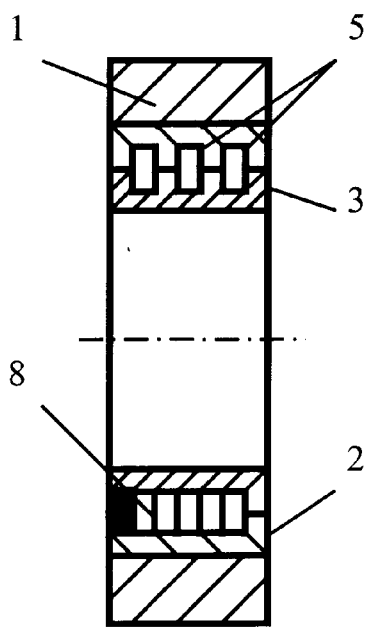
(b)
Figure 3:  Two alternatives of heat pipe arrangements in the bearing.
(a) Groove heat pipes in the outer ring of the bushing.
(b) Groove heat pipes in both the inner and outer rings of the bushing.

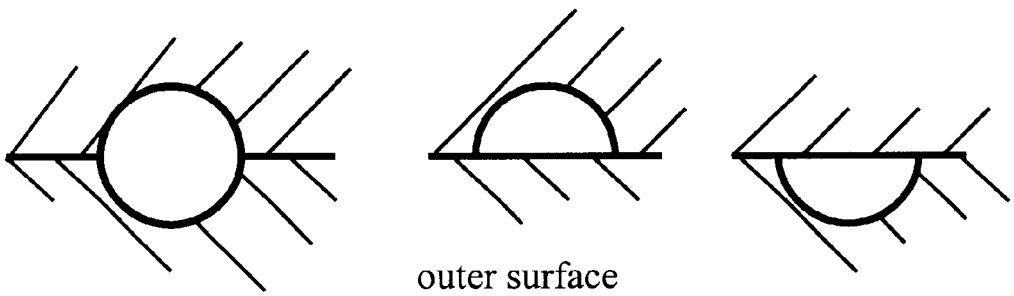
(a)
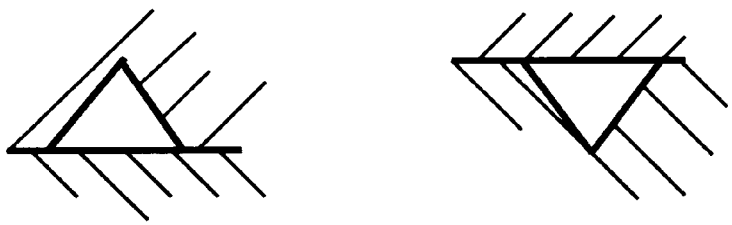
(b)
(c)
Figure 4. Different cross-sections of heat pipes grooves.
    (a)    Circular and arc shapes.
    (b)    Triangular shapes.
    (c)    Trapezoid shapes.

ISOTHERMAL JOURNAL BEARING

This application claims benefit to U.S. Provisional No. 60/050,245 filed Jun. 19, 1997.

FIELD OF THE INVENTION

This invention relates to journal bearings under fluid lubrication, solid and powder lubrication, or dry contact.

The invention can improve the thermal efficiency, performance and service life of bearings, and can find applications in various industries, such as the bearing, automotive and heavy-duty machinery industries.

BACKGROUND OF THE INVENTION

Frictional heat is generated at the interface of two elements in a relative motion as a product of surface rubbing. Some of the heat generated is dissipated through the non-contacting surface area into a convective medium, such as air or a lubricant. However, a considerably large amount of heat is conducted into the solid media of the contacting elements, resulting in a temperature increase in the solid. The temperature of the contact interface can be much higher than that of the surrounding material. Today, the demands for compact design may require bearing surfaces to work under severe conditions, such as high loads. It is anticipated that the accumulation of frictional heat will become a major problem in these situations.

Bearings with less lubricant supply are attractive due to the economic and environmental considerations. Lubrication by solid powder represents a new direction in bearing development (ASME 95-Trib-42, by Heshmat and Brewe, 1995, pages 1 to 2). However, heat is a serious barrier that controls the load capacity of the bearing and limits the reduction in the use of fluid lubricants. Solid lubricants can replace the lubrication function of the conventional fluid lubricants. It is anticipated that if the cooling function is provided by appropriate means, bearings with solid lubricants can compete with the fluid-lubricated journal bearings.

Due to the continuous release of the frictional heat, the contact interface constantly works under a high temperature, facing scuffing and seizure failures (Wang et al., *Tribology Transactions*, pp. 587–593, 1994; Ni and Cheng, *Tribology Transactions*, pp. 121–129, 1995). Temperature uniformity is critical for conformal contact elements, such as journal bearings, whose performance is strongly controlled by clearance. Due to the bearing structural distortion caused by frictional heating, the bearing may lose its designed clearance, resulting in multi-contacts and seizure failure (Hazlett and Khonsari, *Tribology International*, pp. 177–182, 1992; and Wang et al., ASME 95-Trib-33, 1995). It is clear that temperature reduction at the contact interface and prompt dissipation of frictional heat from the contact region are crucial to protecting tribological interfaces and retaining the anti-failure capability of bearing surfaces. They are also critical to the development of bearings for future machinery with high load capacity and less lubricant consumption.

Generation of frictional heat at the contact interface creates heat sources. If a heat sink could be created at appropriate locations, it would be possible to transfer the frictional heat directly away through the sink. Heat pipes are ideal heat sinks for this consideration. The isothermal journal bearings that incorporate heat pipes can be ideal structures for bearings with low tendency of failure. These bearings may find wide applications in heavy-duty machinery. They can also be used for the bearings lubricated by a solid lubricant, such as lubricious powders, or as bearings without lubrication.

SUMMARY OF THE INVENTION

The objective of this invention is to develop isothermal journal bearings with excellent thermal-mechanical performance. The key to these new journal bearings is the incorporation of heat pipes into the bodies, rings, or bushings of the bearings for effective heat conduction and dissipation. Heat pipes are heat transfer devices that have a superior effective thermal conductance as high as hundreds of times that of copper. Detailed descriptions on heat pipes, including two-phase closed thermosyphons, can be found in a publication entitled *Heat Pipes,* by Dunn and Ready, Pergamon, N.Y., 1982, where a general description on heat pipes is contained on pages 1 to 20.

The heat pipes used for isothermal journal bearings are gravity-assisted heat pipes. The new journal bearing thus developed sandwiches a group of circumferential heat pipes between two rings, namely the inner and outer rings. The fabrication process of the isothermal journal bearings involves machining the heat pipe grooves on the bearing rings and assembling those rings to form the bearing structure. Evacuation, fluid filling, and welding of the heat pipe then follow after the assembly of the rings. Final machining of the bearing working surfaces may be conducted then to correct potential geometry distortion caused by welding. The isothermal journal bearing thus produced will have a configuration similar to that of the conventional bearings, but are much more effective in conducting and dissipating the frictional heat. The aforementioned new isothermal journal bearing has the following technological advantages:

1. The groove heat pipes have small cross-sectional areas and extend to the entire circumference of the bearing. The evaporation and condensation process in the heat pipes result in a rapid heat transfer in the circumferential direction and an enhanced convective cooling through the entire bearing surface. If an external cooling is provided, the bearing can be maintained at a low and constant temperature.
2. Due to the extremely high thermal conductance and quick response of the heat pipe, frictional heat can be promptly dissipated by the heat pipe from the location where it is generated. Therefore, the surface temperature in the bearing contact area can be greatly decreased, and the tendency of contact failure could be significantly reduced.
3. Uniform temperature is one of the critical factors to preventing contact failures induced by structural distortion. As a result of the heat pipe function, the bearing temperature in the circumferential direction will be relatively uniform. The structural distortion could be controlled within a small scale and the working clearance of the journal bearing can be well maintained. Thus, failures induced by thermal distortion may be prevented.
4. Heat pipe cooling is completely passive. Since no additional energy sources are needed to support the cooling process, the isothermal journal bearing can function well on an energy-saving basis.
5. The new bearing has a simple structure with low manufacturing costs. Therefore, the isothermal journal bearing presented herein provides a unique cooling technique without any technical barriers.

BRIEF DESCRIPTION OF THE DRAWINGS

FIG. 1 is a set of schematics of an isothermal journal bearing that consists of a bearing house and a bushing whose two rings sandwich a group of groove heat pipes. A cutaway view (FIG. 1 a) and a sectional view (FIG. 1 b) show the heat pipe grooves on the inner ring of the bushing. Two directional views (FIGS. 1 c and 1 d) show the structure of the evaporator section of the heat pipes and the grooves on the top of the inner ring. An enlarged view (FIG. 1 e) shows liquid return and vapor flow within a heat pipe groove.

FIG. 2 is a set of schematics of an isothermal journal bearing that consists of a bearing house with built-in heat pipes and a bushing. A cutaway view (FIG. 2 a) and a sectional view (FIG. 2 b) show the heat pipe grooves in the inner ring of the bearing house and an outlet connecting the groove heat pipes with an external cooling source for enhanced cooling. A directional view (FIG. 2 c) shows the channel connection of grooves on the top of the inner ring. An enlarged view (FIG. 2 d) shows the connection between the bearing house and heat pipe outlet.

FIG. 3 shows two alternatives of heat pipe arrangements in the bearing bushings, with the heat pipe grooves in the outer ring (FIG. 3 a) and in both the inner and outer rings (FIG. 3 b).

FIG. 4 shows different cross-sectional shapes of the heat pipe.

DETAILED DESCRIPTION OF THE INVENTION

FIG. 1 schematically shows the structure of an isothermal journal bearing that consists of a bearing house 1 and a bushing comprised of two rings, the outer ring 2 and inner ring 3. Rings 2 and 3 sandwich a group of heat pipes 5 between them. The inner diameter and outer diameter of the inner ring are represented respectively by $D_i$ and D. The inner diameter and outer diameter of the outer ring are respectively D and $D_o$. The outer ring may have a shoulder ring 4 for assembly purposes. Groove heat pipes 5 are fabricated through a turning process on the outer surface of the inner ring 3. The groove heat pipe 5 has an evaporator section 6 and a condenser section 7, and the heat pipes may be interconnected through a liquid filling channel 8 through which they can be charged with a suitable amount of working fluid. The directional K-view shows the connection of the heat pipe on the outer surface of the inner ring. Sealing of the groove heat pipes is achieved through a tight fit of two rings, and then the welding of interfaces 9 and 10. After the heat pipes are evacuated, an amount of working fluid 11 is then filled into the heat pipes through the liquid filling channel 8. Finally, the outlet of the liquid filling channel is welded, as indicated by 12, to complete the heat pipe assembly process.

Assuming the contact surface area between the shaft and bearing is on the surface of the bottom half of the inner ring 3, the evaporator section 6 of the groove heat pipe should be in the lower section of the bearing. During the bearing operation, frictional heat 13 is generated in the loading region corresponding to the contact surface area. This heat is absorbed through the vaporization process of the working fluid 11 in the evaporator section 6. The generated vapor 14 flows circumferentially and condenses in the upper portion of the heat pipes, releasing the heat absorbed in the loading region and forming liquid condensate 15. The condensate flows downwards, returning to the evaporate section with the assistance of gravity, as shown in the enlarged I-view, and thus maintaining a continuous heat transfer process in the heat pipe. Due to the large latent heat of vaporization, the heat generated in the loading region is promptly spread over the entire circumferential surface area of the bearing to be dissipated. As a result, the temperature in the loading region can be significantly reduced, and that in the entire bearing can be more uniform.

For a copper bearing, water may be one of the best choices for the working fluid in the heat pipe. For other types of bearing materials, proper anti-corrosion agents, or coating, may be needed if water is to be selected as the working fluid.

When the heat generated in the loading region is large, external cooling may be required to maintain the temperature in the loading region at an acceptable level. For this purpose, heat pipes with an external condenser may be employed. FIG. 2 shows such a bearing with the bearing house cooled by heat pipes having an external condenser. The bearing house is comprised of an inner ring 16 and an outer seat 17. A solid bushing 18, which may be a single piece or two halves of a thin-walled cylinder, is applied in the bearing house. An outlet 19 on the top section of the bearing connects the groove heat pipes with an external cooling source. The aforementioned cooling source may be a two-phase heat exchanger that enables the vapor from the groove heat pipes to be condensed. The cooling source should also enable the condensate to flow back into the groove heat pipes to maintain a continuos operation of the system. The connection between the heat pipe outlet 19 and house 1 can be achieved using bolts 20 with a sealing of "O" ring 21, as shown in the enlarged view in FIG. 2. Welding of the interface between the outlet and bearing house should also be considered for permanent sealing of the heat pipe system. Depending on its cooling capacity, the external cooling source ultimately determines the bearing operating temperature. Therefore, with the assistance of the external cooling source, the bearing temperature can be controlled at a low and adjustable level. The geometry of heat pipe grooves is determined by the width, w, and depth, t, as shown in FIGS. 1 and 2. The width of the sealing edges, labeled as b1 and b2, may be different, depending on structural needs. The width of the filling channel, B, may be larger than the width of the heat pipe grooves to facilitate the liquid charge and communication between different groove heat pipes. The number and size of the groove heat pipes depend on the requirement for heat dissipation and the strength of the bearing. The width, w, of the heat pipe grooves may be as small as 1–2 mm, or even thinner, to satisfy the structural requirement of the bearing. A larger size of heat pipe grooves is preferred for heavy-duty bearings or for applications with a large amount of heat generation, provided that the strength requirement of the bearing is satisfied. Wider journal bearings may allow more heat pipe grooves to be machined. The groove heat pipes may be distributed uniformly or non-uniformly in the width direction of the bearing, in accordance with the location of heat generation. However, the distribution of the groove heat pipes should avoid interfering with oil supply holes, if such holes are needed.

The assembly shoulder 4 in FIGS. 1 and 2 may aid in sealing the groove heat pipes. However, outer rings without this shoulder can also be used, as shown in FIG. 3. If the inner ring of the bushing has a relatively small wall thickness, the heat pipe groove 5 can be machined on the inner surface of the outer ring 2, as shown in FIG. 3 a, or on both the outer surface of the inner ring 3 and the inner surface of the outer ring 2, as shown in FIG. 3 b.

The cross sections of the groove heat pipes may be machined into different shapes, such as those shown in FIG. 4. Machining for the rectangular (including square) cross-sections, as shown in FIGS. 1 through 3, is simpler. These cross-sections provide a maximum contact area with the heat source. The circular cross-sections (including arc), as shown in FIG. 4 a, are superior in strength, and can be made by a shaped cutting tool. The triangle and trapezoidal cross-sections, shown in FIGS. 4 b and 4 c can be fabricated by shaped cutting tools in a similar way.

The groove heat pipes in FIGS. 1 and 2 can be replaced by embedded solid strips 22 shown in FIG. 5. In all cases, the water-metal heat pipes may be replaced by materials, such as copper and carbon, having high longitudinal thermal conductivity. Such "solid heat pipes" could provide high heat-transfer rate with a better mechanical strength.

In addition to their wide applications in the bearing industry for heavy-duty bearings, the isothermal journal bearings disclosed in this invention may also be applicable to the compressor, automotive, and aerospace industries for support design. The conventional wrist pin bearing of a reciprocating mechanism may be replaced by the new isothermal journal bearing. The loading region of this bearing is on the lower portion of the bearing and gravity can be utilized for condensate return in the heat pipe. The uniform bearing temperature may assist the wrist pin joint to maintain the desired working clearance and geometry at normal operation. The prompt heat-spreading characteristics of the isothermal bearing may also enable the bearing-pin contact to sustain unexpected severe working conditions, such as high friction caused by heavy load or poor lubrication.

For powder lubrication, as well as other types of dry contacts that use solid lubricants with no cooling function, the isothermal journal bearing can compensate the solid lubrication with its excellent cooling capability. This combination of solid lubrication/heat pipe cooling has obvious advantages over the conventional bearings. It can make the structure of the tribological system simpler since the lubricant supply system can be considerably simplified. The external power may not be necessary and the cost for maintenance is relatively low. Most significantly, the isothermal bearing may be incorporated with solid lubrication to develop a technique called "green lubrication" for future industries.

We claim:

1. A journal bearing comprised of a bearing housing and a bearing bushing, said bushing having an inner ring, an outer ring, and at least one gravity-assisted groove heat pipe in between said inner and outer rings and extending along the entire circumference of said bearing bushing, thereby the frictional heat generated in the loading region, which is in the lower portion of the journal bearing, is effectively spread circumferentially over the remainder of the bearing, and thereby the temperature in the loading region can be significantly reduced and circumferential temperature uniformity can be achieved.

2. The invention as set forth in claim 1, wherein said groove heat pipes are transversely interconnected through a communication means, such as a transversal groove, thereby said groove heat pipes can be filled through a single outlet.

3. A journal bearing comprised of a bearing housing and a bearing bushing, said bearing housing having an inner ring, an outer seat, and at least one gravity-assisted groove heat pipe in between said inner ring and outer seat, said heat pipe extending along the entire circumference of said bearing house, thereby the frictional heat generated in the loading region, which is in the lower portion of the journal bearing, is conducted to the bearing housing through the bearing bushing and is effectively spread over the remainder of the bearing, and thereby the temperature in the loading region can be significantly reduced and circumferential temperature uniformity can be achieved.

4. The invention as set forth in claim 2, wherein said groove heat pipes are transversely interconnected through a communication means, such as a transversal groove, thereby said groove heat pipes can be filled through a single outlet.

5. The invention as set forth in claim 2, wherein an outlet is provided for said groove heat pipes, and said outlet connects said bearing with an external cooling source for enhanced cooling and temperature control, both vapor and condensate communicating between the heat pipe grooves in said bearing and the cooling source through the same outlet.

* * * * *